(12) United States Patent
Berthelot

(10) Patent No.: US 8,625,198 B2
(45) Date of Patent: Jan. 7, 2014

(54) TRANSPARENT OPTICAL ELEMENT INCLUDING A CELL ASSEMBLY

(75) Inventor: Laurent Berthelot, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 151 days.

(21) Appl. No.: 13/139,711

(22) PCT Filed: Dec. 14, 2009

(86) PCT No.: PCT/FR2009/052523
§ 371 (c)(1),
(2), (4) Date: Jun. 14, 2011

(87) PCT Pub. No.: WO2010/076473
PCT Pub. Date: Jul. 8, 2010

(65) Prior Publication Data
US 2011/0310346 A1    Dec. 22, 2011

(30) Foreign Application Priority Data
Dec. 15, 2008  (FR) ...................................... 08 58559

(51) Int. Cl.
*G02B 27/10*  (2006.01)
(52) U.S. Cl.
USPC ........................................................ 359/619

(58) Field of Classification Search
USPC .......... 351/159, 177; 359/619, 665, 253, 667; 623/6.13
See application file for complete search history.

(56) References Cited

U.S. PATENT DOCUMENTS

| | | | |
|---|---|---|---|
| 7,808,707 B2* | 10/2010 | Cano et al. ..................... | 359/619 |
| 8,134,782 B2* | 3/2012 | Archambeau et al. ........ | 359/665 |
| 2002/0030780 A1 | 3/2002 | Nishida et al. | |
| 2003/0085850 A1 | 5/2003 | Feenstra et al. | |
| 2006/0006336 A1 | 1/2006 | Cano et al. | |
| 2006/0245072 A1 | 11/2006 | Venema | |
| 2006/0279848 A1 | 12/2006 | Kuiper et al. | |
| 2008/0279498 A1 | 11/2008 | Sampsell et al. | |
| 2008/0297720 A1 | 12/2008 | Ballet et al. | |
| 2009/0115962 A1 | 5/2009 | Bovet et al. | |
| 2010/0039611 A1 | 2/2010 | Archambeau et al. | |

FOREIGN PATENT DOCUMENTS

FR            2872589 A1    1/2006

* cited by examiner

*Primary Examiner* — Hung Dang
(74) *Attorney, Agent, or Firm* — Seed IP Law Group PLLC

(57) ABSTRACT

The invention relates to a transparent optical element including an assembly of cells having variable respective depths as measured in a direction perpendicular to a surface of the element having said cells. The cells can be filled with a gas or with mixtures of at least two components having different light refraction index values. The variation of the cell depth increases the variation of an equivalent value of the light refraction index associated with each cell, and reduces the roughness of a lens equivalent to the optical element.

16 Claims, 2 Drawing Sheets

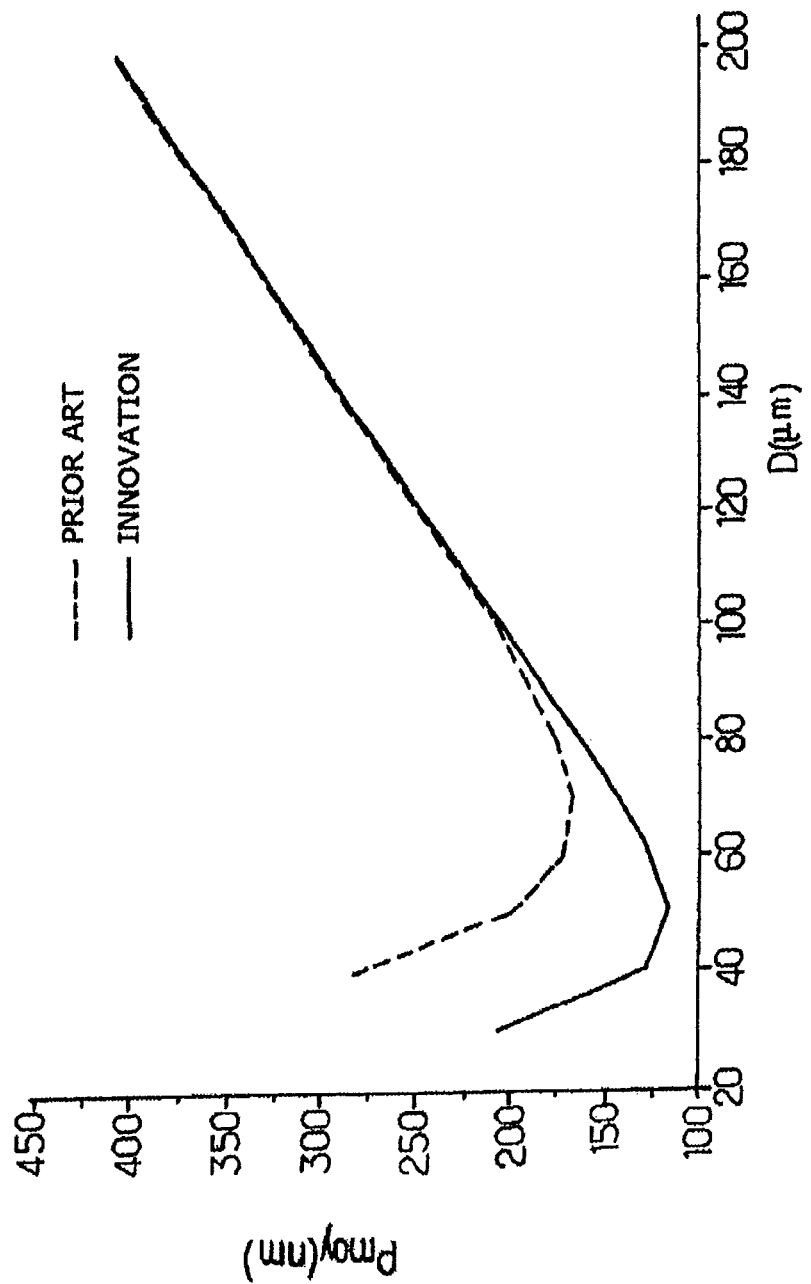

TRANSPARENT OPTICAL ELEMENT INCLUDING A CELL ASSEMBLY

The present invention relates to a transparent optical element including a cell set. It is intended in particular for ophthalmic use, in particular for producing spectacle eyeglasses.

Within the framework of the present description, by transparency is meant the ability to clearly view any object or scene through the optical element, and in particular through the cell set. In other words, the light passing through the cell set is not modified in a manner which could blur the vision. In particular, it is neither diffused nor diffracted, so that a point light source situated at a distance from the optical element is perceived, through the cell set, as a point.

It is known to produce an optical element by introducing portions of substances having optical properties into cells of this element, then sealing the cells. The portions of the substances contained in the cells are thus permanently isolated from each other, and cannot mix together or diffuse between neighbouring cells. The property or properties conferred to the optical element by the substances enclosed in the cells are then permanent throughout the entire useful lifetime of the optical element.

Figure 1:
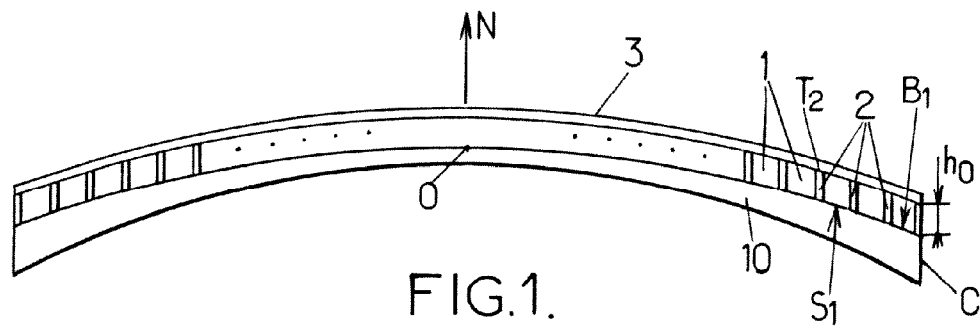

For this purpose, such a transparent optical element comprises, as shown in FIG. 1:
- a substrate 10 with a reference face $S_1$;
- a network of walls 2, carried by the face $S_1$ and forming a set of cells 1 that are separated and juxtaposed parallel to this face, the walls 2 having respective tops $T_2$ situated at a constant height $h_0$ measured from the reference face $S_1$, and
- a film 3 for sealing the cells 1, arranged on the tops $T_2$ of the walls 2, parallel to the reference face $S_1$.

Each cell 1 is thus limited laterally by faces of the walls 2, and is limited between the sealing film 3 and a cell bottom $B_1$ along a direction N perpendicular to the face $S_1$. In the optical elements with cells available prior to the present invention, the bottom $B_1$ of each cell 1 is merged with the reference face $S_1$ of the substrate 10. The height $h_0$ of the walls 2 is then equal to an internal depth of the cells, which is measured between the tops $T_2$ and the bottom $B_1$, in the direction N. This depth is identical for all the cells 1 of the optical element.

Each cell 1 contains moreover a transparent medium.

In particular, the walls 2 may be constituted by a lithographic resin. The network of these walls can then be formed by selectively irradiating a layer of the resin through a mask, then curing it. The dimensions of the walls 2 are chosen in order to prevent or reduce any light diffusion that could be produced by each wall individually. Simultaneously, the pattern of the network of the walls 2 is selected so as to prevent constructive interference that could result from such individual diffusions in certain directions. In this manner, the network of the walls 2 does not reduce the transparency of the optical element in the meaning defined above.

The portion of a substance having an optical property which is introduced into each cell 1 constitutes the transparent medium contained therein.

For certain applications, an optical effect is sought for the element, which is a diopter power similar to that of an optical lens. For this purpose, the transparent media contained in the cells 1 have respective variable values for a light refraction index, such that macroscopic index gradients are formed on the face $S_1$ of the optical element. These index gradients are selected in a known manner in order to produce the sought optical power. This optical power P is given by the following relationship:

$$P = -2 \cdot h_0 \cdot \Delta n / R^2, \tag{1}$$

where R is the radius of a circular edge C of the substrate 10 and $\Delta n$ is the difference in light refraction index of the medium contained in the cells 1, between the centre O and the edge C of the element. In other words: $\Delta n = n(R) - n(O)$. According to the sign of $\Delta n$, the lens that is equivalent to the optical element is convergent (value of n higher at the centre O) or divergent (value of n higher close to the edge C). The optical power that can thus be produced for the optical element is therefore limited by the amplitude of the variations of the light refraction index for the transparent media contained in the cells 1. The materials suitable for use in order to constitute these transparent media may have refractive index values which vary to an extent that is insufficient for obtaining a sought optical power, in particular when this optical power is high.

In order to overcome this limitation due to the available transparent materials, it is known to form discontinuities of the refractive index between neighbouring cells. These discontinuities produce sudden increases in the length of the optical path which are multiples of a light wavelength. The optical power of the element can thus be increased for this wavelength, by phase folding effect, in the same way as for a Fresnel lens. But the optical element then has a significant chromatism, due to the fact that the sudden increases in the length of the optical path are only suitable for a single wavelength within the visible light range.

Moreover, an efficient and inexpensive method for introducing the portions of substances having optical property into the cells 1, with variable compositions between different cells, consists of injecting these portions into the cells by using a material injection head of the inkjet type. For example, the injection head is fed from two tanks which separately contain two constituents of the transparent medium, and is designed to produce fixed-volume drops from one or other of the tanks. The filling of each cell 1 corresponds to a maximum number of drops that is identical for all the cells, so that each filled cell contains a whole number of drops of one of the constituents, completed up to the maximum number of drops by the other constituent. The transparent media contained in the cells 1 are thus mixtures of the two constituents, with proportions restricted to values that are multiples of the inverse of the maximum number of drops in each cell. For this reason, the optical property of the transparent media contained in the cells varies by a fixed increment, and can adopt only a limited number of values. When this optical property is the light refraction index, such incremental variations have an effect identical to that of thickness steps for the equivalent lens if the latter is constituted of a homogeneous material. According to another interpretation, these incremental variations contribute to a roughness of the equivalent lens. They therefore cause a light diffusion which reduces the transparency of the optical element.

Taking account of these limitations and drawbacks of the known optical elements with cells, a first object of the invention consists in proposing such an element with apparent variations of the light refraction index, which increase between some of the cells that are distant from each other.

A second object of the invention consists in proposing a transparent element with cells of the previous type, which has a reduced chromatism.

A third object of the invention consists of proposing a transparent element with cells, of which the variations of refractive index between different cells can be less than the variations of known elements of the prior art, when the contents of the cells are obtained in the same way. This third object of the invention can relate in particular to optical elements the cells of which are filled with mixtures by using an injection head of the inkjet type for the injection of material.

Finally, a fourth object of the invention consists in proposing a transparent optical element with cells, which produces a reduced light diffusion.

For this purpose, the invention proposes a transparent optical element with cells, such as described previously, characterized in that at least some of the cells have different depths, with an additional portion of a transparent solid material arranged between the bottom of each of these cells and the reference face of the substrate. In addition, the material of the additional portions and the medium which is contained in the at least one of the cells have respective light refraction index values that are different.

The optical element of the invention is transparent in the meaning already explained. As a result, when he is situated on one side and at a distance from the element, an observer has a clear vision of a scene situated on the other side of this element, with also a separation distance between the scene and the optical element.

Some cells of an optical element according to the invention are therefore differentiated by depth variations. These depth variations produce variations in the length of the optical path, for light rays passing through the element in different cells. Thus, a depth distribution of the cells is created on the surface of the optical element, which can confer to the optical element a macroscopic dioptric effect. In particular, the depths of the cells and the media contained therein may have variations which are adapted in order to confer to the element an optical effect similar to that of a lens. The element itself then has an optical power.

The depth variations of the cells introduced by the invention are theoretically equivalent to variations in the refractive index of a virtual cell medium contained in cells having constant depth. Such virtual index variations can then be greater than the index variations produced only by varying transparent materials contained in the cells.

Given that the depth variations of the cells involve the refraction of the light rays at the bottom of each cell, the resulting chromatism is low. In particular, it is much lower than a chromatism that would result from phase folding.

Moreover, the depths of the cells, which are variable according to the invention, can easily be controlled with precision. In particular, they can be digitally controlled. For this reason in particular, such an optical element can be mass-produced with a high degree of reproducibility.

In particular, the depth variations of the cells may easily be small, producing small variations in the length of the optical path for light beams that pass through the element in different cells. In particular, these variations in the length of the optical path can be less than those which would result from mixtures produced by an injection head of the inkjet type for the injection of material.

According to a first embodiment of the invention, several cells having different respective depths may each contain an identical medium. The filling of the cells is then particularly simple. In particular, this may be a collective filling, by which all the cells are filled simultaneously with a common substance having a single composition.

According to a second embodiment of the invention, the media contained in several cells that have different depths may comprise respectively, mixtures of at least two cell-filling constituents, with proportions that may vary between at least some of these cells. In this case, the depth variations in the cells are combined with the variations of the medium contained in each cell. In particular, the cell-filling constituents may have different light refraction index values. The combination of the depth variations and the variations of the media contained in the cells then makes it possible to obtain variations in the length of the optical path that are less than those which would result only from the variations of the media contained in the cells. The roughness of the homogeneous lens that is equivalent to the optical element can thus be reduced. The transparency of the optical element is therefore increased.

The invention also proposes a transparent optical component, which comprises a base optical component and a transparent optical element such as described previously. The transparent optical element is then fixed on a face of the base component. For this purpose, the optical element may be a thin multi-layer structure having parallel faces, one of the primary layers of which incorporates the cell set.

Figure 2A:
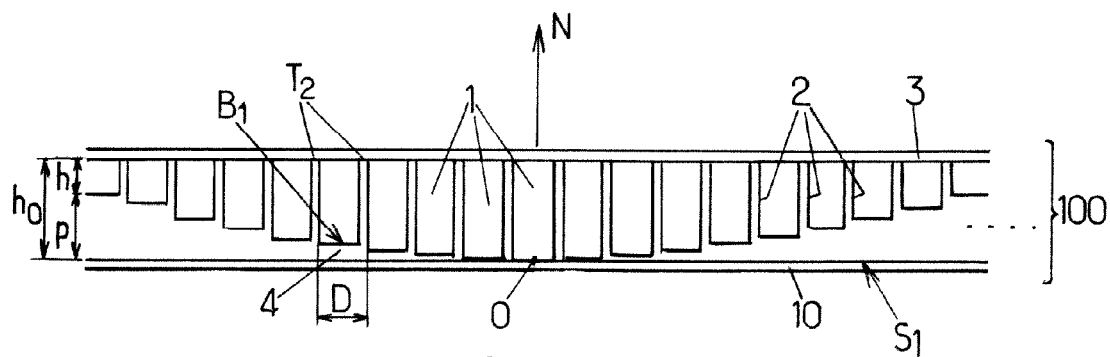
Figure 2B:
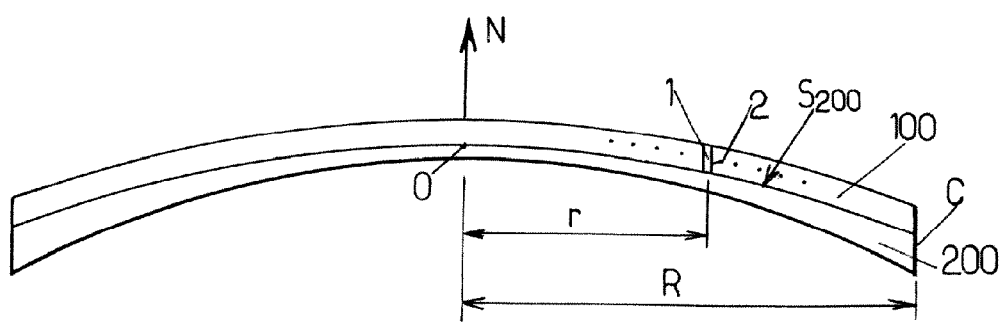

Other features and advantages of the present invention will become apparent in the following description of non-limitative embodiments, with reference to the attached drawings, in which:

FIG. 1, already described, is a cross-sectional view of an optical element with cells as known prior to the present invention;

FIGS. 2a and 2b are respective cross-sectional views of an optical element and an optical component with cells according to the present invention; and FIG. 3 is a comparison diagram of two optical elements, obtained respectively without using the invention and using the invention.

In these figures, for sake of clarity, the dimensions of the elements shown in FIGS. 1, 2a and 2b are not in proportion to actual dimensions and dimensional ratios. Moreover, identical references indicated on different figures denote identical elements, or those having identical functions. In addition, N denotes a direction perpendicular to the surface of the substrate, on which the present invention is implemented.

By way of illustration, the following description relates to an application of the invention to the ophthalmic field. More particularly, the optical component obtained is an ophthalmic spectacle eyeglass, capable of producing a vision correction for a wearer of this eyeglass.

According to FIG. 2a, an optical element 100 in the form of a multilayer structure comprises a base film 10 forming a substrate, a cell set 1 and a sealing film 3. The cells 1 may be formed in an intermediate layer of lithographic resin having a thickness $h_0$, measured along the direction N. $S_1$ is the face of the film 10 which carries the layer of resin.

The cells 1 may be formed by lithography, so that the walls 2 correspond to portions of resin that are cross-linked and remain permanently between portions of resin which have been dissolved in order to form the cells. Moreover, the lithographic mask that is used for defining the walls 2 may be absorbing in the zones corresponding to the cells 1, with variable absorption levels in these zones. Thus, a portion of lithographic resin that is initially situated at the location of a cell 1 is more irradiated if the mask is less absorbing at this place. It is then dissolved more slowly during the curing of the resin, so that a residual portion 4 of resin remains after curing at the bottom of the cell formed. This cell then has a depth which is reduced by the thickness of the residual portion 4. Optionally, the resin may be exposed again to the irradiation beam, in order to cross-link and thus permanently fix the portion 4. Generally, each residual portion 4 is solid, that is to say that it cannot deform, creep, flow, or mix with the content of the corresponding cell 1. Furthermore, the residual portions 4 are advantageously inert and impermeable with respect to the transparent media contained in the cells 1. In this manner, the element 100 is provided with the set of cells 1, with individual cell depths that can vary. These individual depths of the cells 1 are generically referenced h. The thickness of the portion of resin 4 remaining below each cell 1 is referenced p, so that $h+p=h_0$, whatever the cell 1 in question. For this reason, each portion 4 is called an additional portion of the corresponding cell 1, and the face $S_1$ is called the reference face.

For the method of forming the cells 1 that has just been described, the walls 2 and the portions 4 are all constituted by lithographic resin. Optionally, one or more coatings may be applied onto the walls 2, so that these walls are constituted partially of a material identical to that of the portions 4.

For other methods of forming the variable-depth cells 1, it is possible for only the additional portions 4 to be made of lithographic resin. The walls 2 may then be made of silica ($SiO_2$) or alumina ($Al_2O_3$), for example. Finally, the walls 2 and the portions 4 may be constituted at least partially from the same material, other than a lithographic resin. Generally, the set of cells 1 may be produced by one of the following techniques: photolithography, stereolithography, embossing, laser engraving, etc.

In any event, the material of the additional portions 4 is transparent.

The respective centres of neighbouring cells 1 may be separated, parallel to the face $S_1$, by a distance D comprised between 10 μm and 200 μm (micrometre), preferably between 40 μm and 75 μm. In this manner, the cells 1 are both sufficiently small so that they are not visible individually, and sufficiently large so that they do not cause light diffusion. The optical element 100 is then aesthetically pleasing and transparent. The distance D is also the dimension of the cells 1 that is parallel to the face $S_1$ of the film 10.

The film 3 may be applied onto the tops $T_2$ of the walls 2 directly, or with an intermediate layer of a gel or an adhesive material which is not shown. In any event, the thickness $h_0$ is the height of the walls 2, measured from the face $S_1$ of the film 10 used as a reference. The depth h of each cell 1 is measured from the tops $T_2$ of the walls 2, to the bottom $B_1$ of this cell which corresponds to the upper surface of the underlying additional portion 4.

As shown in FIG. 2b, the transparent optical element 100 that has just been described may be applied onto a face $S_{200}$ of a base optical component 200. In this manner, a new optical component is obtained, comprising the base component 200 and the element 100. The base component 200 may itself be a lens, in particular an ophthalmic eyeglass. In this case, the respective dioptric effects of the element 100 and of the base eyeglass 200 are combined to produce a total dioptric effect for the new optical component. Thus, the element 100 produces the optical power P which is given by the relationship (1), in addition to the optical power of the base eyeglass 200. In FIG. 2b, R denotes the diameter of the face $S_{200}$, which is limited by the edge C. This diameter may be equal to 60 mm (millimetre), for example, when the base eyeglass 200 has not yet been cut out to the dimensions of a spectacle frame seat.

In order to produce a sufficient optical power P, the depth h of the cells 1 may vary between 5 μm and 30 μm, preferably between 15 μm and 25 μm.

In the first embodiment, which is now described, all the cells 1 contain the same transparent medium. This medium may be, for example, air, an inert gas, or a vacuum. By inert gas, is meant any gas which does not react chemically with any of the materials of the element 100, so that it is unchanged for the lifetime of the element 100. By vacuum, is meant a medium which has a reduced pressure inside the cells 1, in comparison with the pressure existing outside the optical element 100. An advantage of gaseous media resides in their light refraction index value, close to 1.0, which presents a significant divergence from the index value of the additional portions 4. In fact, as the latter material is solid, its light refraction index value is generally greater than 1.6.

More generally, the length L of the optical path parallel to the direction N, between the reference face $S_1$ and the tops $T_2$ of the walls 2, is:

$$L = p \cdot n_4 + h \cdot n_1 = [n_4 + (n_1 - n_4) \cdot h/h_0] \cdot h_0$$

where $n_1$ and $n_4$ are the light refraction index values respectively for the transparent medium contained in one of the cells 1 and for the transparent material of the portions 4. The length L varies as a function of the cell 1 through which the light beam passes. In other words, the refractive index $n_{eq}$ of a homogeneous material contained in a cell of an optical element as shown in FIG. 1, having a depth of cells that is constant and equal to $h_0$, and which would result in the same optical path length, is:

$$n_{eq} = n_4 + (n_1 - n_4) \cdot h/h_0 \qquad (2)$$

The latter is called the equivalent refractive index, or apparent index, for the cell 1 in question.

In a second embodiment of the invention, it is assumed that the cells are each filled with a mixture of two constituents A and B, having respectively different values $n_A$ and $n_B$ for the light refraction index. In this case, the index of the transparent medium contained in a cell 1 is:

$$n_1 = n_A \cdot x_A + n_B \cdot (1 - x_A) = n_B + \Delta n_{AB} \cdot x_A$$

where $x_A$ and $\Delta n_{AB}$ denote respectively the proportion of the constituent A in the mixture which is contained in the cell 1 in question, and the difference between the indices of the two constituents A and B of the mixture ($\Delta n_{AB} = n_A - n_B$). The apparent index given by the relationship (2) is then for this cell:

$$n_{eq} = n_4 + \Delta n_{B4} \cdot h/h_0 + \Delta n_{AB} \cdot x_A \cdot h/h_0 \qquad (3)$$

where $\Delta n_{B4} = n_B - n_4$. The difference between the apparent indices of two different cells 1 and 1', each given by the relationship (3), is then:

$$\Delta n_{eq} = \Delta n_{B4} \cdot \Delta h/h_0 + \Delta n_{AB} \cdot (x_A \cdot h - x'_A \cdot h')/h_0 \qquad (4)$$

$$= [\Delta n_{B4} + \Delta n_{AB} \cdot x_A] \cdot \Delta h/h_0 + \Delta n_{AB} \cdot (h'/h_0) \cdot \Delta x_A$$

where h' is the depth of the cell 1', Δh is the depth variation between the cells 1 and 1' (Δh=h−h'), and $\Delta x_A$ is the variation in the proportion of the constituent A between the cells 1 and 1' ($\Delta x_A = x_A - x'_A$, $x'_A$ being the proportion of the constituent A for the cell 1').

If all the cells have the same depth h, then the first term of $\Delta n_{eq}$ in the relationship (4), which is proportional to the depth variation Δh, is zero. Only $\Delta n_{eq} = \Delta n_{AB} \cdot (h/h_0) \cdot \Delta x_A$ then remains, which is maximum when $\Delta x_A = 1$ and $h = h_0$: $\Delta n_{eq\ MAX} = \Delta n_{AB}$.

The introduction, according to the present invention, of a cell depth variation adds the first term of the relationship (4) to the apparent index variations of the cells. If $n_4$ is greater than $n_A$, itself greater than $n_B$, the maximum variation of $n_{eq}$ is obtained for h=0, h'=$h_0$ and $x'_A$=0. It is $\Delta n_{eq\ MAX} = \Delta n_{B4}$, which is greater than $\Delta n_{AB}$, in absolute value.

The invention therefore makes it possible to increase the achievable absolute optical power of the element 100, according to relationship (1).

For this purpose, and in an identical manner with respect to the optical elements known prior to the present invention, the variation of the apparent index value for each cell, $\Delta n_{eq}$, with respect to the value at the centre O of the optical element 100, preferably complies with the following relationship:

$$\Delta n_{eq}(r) - \Delta n_{eq}(O) = [\Delta n_{eq}(R) - \Delta n_{eq}(O)] \cdot (r/R)^2, \quad (5)$$

where r is the radial distance of the cell 1 measured from to the centre O (FIG. 2b).

Moreover, when the depth of the cells and the proportions of the mixtures vary incrementally, the variation of the depth of the cells adds, via the relationship (4), additional values for $\Delta n_{eq}$ that are intermediate between 0 and $\Delta n_{eq\ MAX}$. The achievable values for the difference in the apparent index $\Delta n_{eq}$ are then more numerous, with respect to an optical element having a constant cell depth, based on the same constituents of mixtures A and B and the same increment of the proportions of mixtures. The differences in the values of $\Delta n_{eq}$ with respect to the values calculated by the formula (5) can therefore be reduced. As a result, the invention also makes it possible to reduce the sudden increases in the length of the optical path that are present between neighbouring cells. The lens of homogeneous material that is equivalent to the optical element 100 then has a reduced roughness. For this reason, the optical element 100 with a variable depth of cells is more transparent.

The inventors have determined that the quadratic roughness of the equivalent homogenous lens results from a combination of two contributions for each cell.

The first contribution to this quadratic roughness for each cell 1 originates from the use of cells in each of which the apparent index $n_{eq}$ is uniform. In other words, the first contribution results from the breakdown of the face $S_1$ into discrete cells, commonly called pixellation. It is proportional to the square of the dimension D of the cells 1 parallel to the face $S_1$ of the substrate 10. Moreover, this first contribution is higher close to the edge C of the element 100, for a dimension D of the cells which is constant. Indeed, according to the relationship (5), the variation of $\Delta n_{eq}$ is greater close to the edge C, so that the constant dimension D generates sudden increases in the length of the optical path which increase with the radial distance r. Actually, the invention does not change this first contribution to the quadratic roughness of the equivalent lens in relation to the known optical elements of the prior art.

The second contribution for each cell 1 originates from the difference for this cell, between the actual value of $\Delta n_{eq}$ and the theoretical value which is calculated by the formula (5) for the centre of this cell, as a function of the radial distance r separating this cell centre from the centre O of the optical element 100. Indeed, the actual value depends on the technique used to form the mixtures of the two constituents A and B that are introduced into the cells. When an injection head as described previously is used to inject material, with a fixed volume for each drop of one or other of the mixture constituents A and B that is introduced into the cells, this second contribution varies mainly in proportion to the square of this drop volume. Indeed, this drop volume limits the achievable proportions of mixture to discrete values, and as a result also limits the actual difference in the values of the apparent index $\Delta n_{eq}$. As already explained, the invention makes it possible to reduce this second contribution to the quadratic roughness of the lens that is equivalent to the optical element 100.

But this second contribution depends both on the drop volume and the individual volume of the cells 1. Indeed, the number of achievable discrete values for the proportions of mixture is smaller when the cells are themselves smaller. Thus, the second contribution to the quadratic roughness is simultaneously inversely proportional to the square of the dimension D of the cells.

The average quadratic roughness $\rho_{moy}$ of the lens is obtained by calculating an average quadratic value of the contributions of all the cells. Because of the first cell contribution given previously, for a fixed diameter R of the lens, the average quadratic roughness $\rho_{moy}$ varies proportionally to the cell dimension D, when this dimension is large enough, typically greater than 80 µm. It also becomes infinite when the cell dimension D tends towards zero, due to the second cell contribution also explained previously. Owing to these extreme variations, the average quadratic roughness $\rho_{moy}$ of the lens has a minimum value with respect to variations in the dimension D of the cells.

FIG. 3 shows the variations in the average quadratic roughness of the homogeneous lens that is equivalent to the optical element 100, as a function of the cell dimension D. The values of the dimension D, expressed in micrometres (µm), are marked on the x-axis. The values of the average quadratic roughness $\rho_{moy}$ are expressed in nanometres (nm) and marked on the y-axis. The two curves shown on the diagram correspond to the following values: R=10 mm, P=1.0 diopter, $n_{eq}(R) - n_{eq}(O) = 0.25$ and a drop volume of 6 pl (picolitre), respectively for a cell depth which is constant (curve in broken lines corresponding to the state of the art prior to the present invention) and for a variable depth (solid line corresponding to use of the invention). The minimum value of the quadratic roughness which is obtained in the case of the variable cell depth is approximately 133 nm. It is obtained for a dimension D of the cells 1 of approximately 50 µm. By way of comparison, the minimum value of the quadratic roughness without varying the depth of the cells is approximately 170 $nm^2$, obtained for the value 70 µm of the dimension D of the cells 1.

It is understood that the numerical values which have been quoted in the preceding description of the invention have been given solely by way of illustration. A person skilled in the art will know how to adapt them according to the use intended for the optical element. Moreover, the method of producing the cells of the optical element, as well as the technique used to fill them, can be changed.

The invention claimed is:

1. A transparent optical element allowing a clear vision of an object or a scene through said optical element and comprising:
    a substrate with a reference face;
    a network of walls carried by the reference face and forming a set of cells that are separated and juxtaposed parallel to said reference face, the walls having respective tops situated at a constant height measured from the reference face, and
    a film for sealing the cells, arranged on the tops of the walls parallel to the reference face,
    each cell being limited laterally by faces of the walls, and limited between the sealing film and a cell bottom along a direction perpendicular to the reference face, with an inner depth of the cell measured between the tops of the walls and the bottom of said cell, along said perpendicular direction, and containing a transparent medium, wherein:
    at least some of the cells have different depths, with an additional portion of a transparent solid material arranged between the bottom of each of said cells and the reference face, the material of the additional portions and the medium is contained in at least one of the cells having different respective light refraction index values, and the inner depths of the cells having a distribution that provides a macroscopic dioptric effect to the transparent optical element.

2. A transparent optical element according to claim 1, in which the walls are at least partially constituted by a material identical to the material of the additional portions.

3. A transparent optical element according to claim 1, in which the material of the additional portions is a lithographic resin.

4. A transparent optical element according to claim 1, in which several cells having different respective depths each contain an identical medium.

5. A transparent optical element according to claim 4, in which said identical medium is air, an inert gas, or a vacuum.

6. A transparent optical element according to claim 1, in which the media contained in several cells having different respective depths, comprise respectively mixtures of at least two constituents for filling the cells, with proportions that can vary between at least some of said cells.

7. A transparent optical element according to claim 6, in which the constituents for filling the cells have different respective light refraction index values.

8. A transparent optical element according to claim 1, in which the depth of the cells varies between 5 μm and 30 μm.

9. A transparent optical element according to claim 1, in which centres of neighbouring cells are separated, parallel to the reference face, by a distance comprised between 10 μm and 200 μm.

10. A transparent optical element according to claim 1, in which the depths of the cells and the media contained in said cells have variations suitable for conferring to said element an optical power similar to an optical lens effect.

11. A transparent optical element according to claim 1, in which the substrate comprises a base film.

12. A transparent optical component comprising a base optical component and a transparent optical element according to claim 11, said element being fixed on a face of said base component.

13. A transparent optical component according to claim 12, forming an ophthalmic spectacle eyeglass capable of producing a vision correction for a wearer of said eyeglass.

14. A transparent optical component according to claim 13, in which the base optical component is itself an ophthalmic eyeglass.

15. A transparent optical element according to claim 1, in which the depth of the cells varies between 15 μm and 25 μm.

16. A transparent optical element according to claim 1, in which centres of neighbouring cells are separated, parallel to the reference face, by a distance comprised between 40 μm and 75 μm.

\* \* \* \* \*